(12) United States Patent
Cohen et al.

(10) Patent No.: US 8,799,352 B2
(45) Date of Patent: Aug. 5, 2014

(54) REVERSE CONTEXT SYSTEM

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1748 days.

(21) Appl. No.: 11/451,130

(22) Filed: Jun. 12, 2006

(65) Prior Publication Data

US 2007/0288654 A1    Dec. 13, 2007

(51) Int. Cl.
*G06F 15/16* (2006.01)

(52) U.S. Cl.
USPC ........................................................ 709/203

(58) Field of Classification Search
CPC ... H04M 3/42093; H04M 3/436; H04M 3/56; H04M 2201/18
USPC .......... 455/417, 415; 709/201–203, 245, 228, 709/239
See application file for complete search history.

(56) References Cited

U.S. PATENT DOCUMENTS

| | | | |
|---|---|---|---|
| 6,438,216 B1 * | 8/2002 | Aktas | 379/88.01 |
| 6,721,412 B1 * | 4/2004 | Youngs | 379/204.01 |
| 6,735,295 B1 * | 5/2004 | Brennan et al. | 379/215.01 |
| 6,968,182 B1 * | 11/2005 | Kim | 455/418 |
| 7,103,167 B2 * | 9/2006 | Brahm et al. | 379/211.02 |
| 7,184,527 B1 * | 2/2007 | Lin et al. | 379/93.17 |
| 7,260,205 B1 * | 8/2007 | Murphy et al. | 379/215.01 |
| 7,280,646 B2 * | 10/2007 | Urban et al. | 379/142.01 |
| 7,315,614 B2 * | 1/2008 | Bedingfield et al. | 379/142.07 |
| 7,493,110 B2 * | 2/2009 | Jiang | 455/418 |
| 2001/0034599 A1 * | 10/2001 | Kage et al. | 704/3 |
| 2003/0215078 A1 * | 11/2003 | Brahm et al. | 379/211.02 |
| 2006/0126806 A1 * | 6/2006 | Trandal et al. | 379/88.26 |
| 2006/0133590 A1 * | 6/2006 | Jiang | 379/201.01 |
| 2007/0081636 A1 * | 4/2007 | Shaffer et al. | 379/80 |

\* cited by examiner

*Primary Examiner* — Thai Nguyen

(57) ABSTRACT

One aspect relates to indicating at least partially relative to an at least one receiving communicating device a called entity information at least partially describing an at least one desired contacting or forwarding entity that an at least one contacting communicating device is attempting to contact. Another aspect can relate to transferring from at least one desired contacting or forwarding entity a called entity information at least partially describing the at least one desired contacting or forwarding entity which an at least one contacting communicating device is attempting to contact. Yet another aspect can relate to filtering out communications having at least one desired uniform resource identifiers that do not contain a prescribed called entity information matching a prescribed pattern.

28 Claims, 12 Drawing Sheets

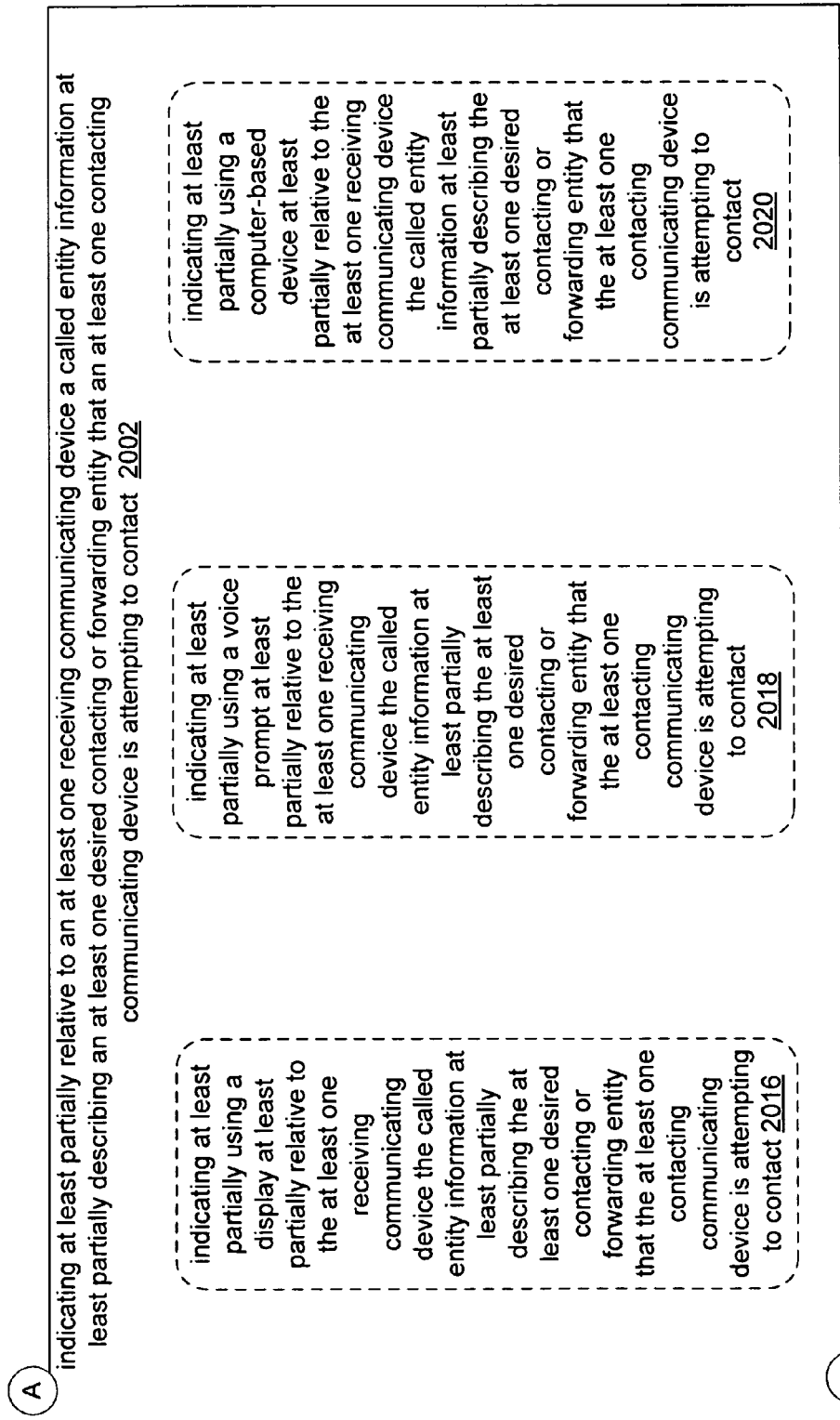

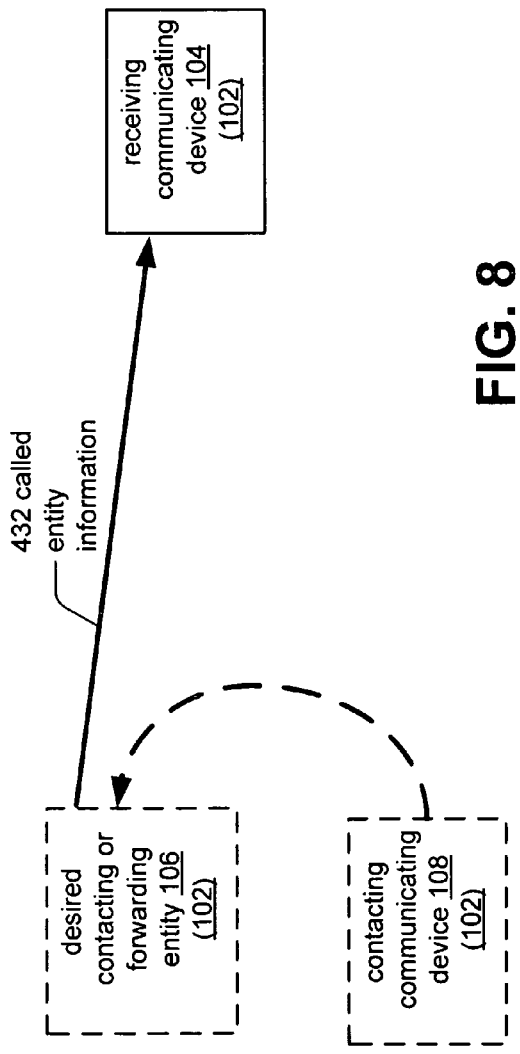

FIG. 8 determining at least partially at a receiving communicating device a called entity information at least partially describing a desired contacting or forwarding entity that a contacting communicating device is attempting to contact, in which the receiving communicating device and at least one other telephonic device is associated with a single individual or group, and wherein the receiving communicating device and the at least one other telephonic device can receive communications from the contacting communicating device 2202

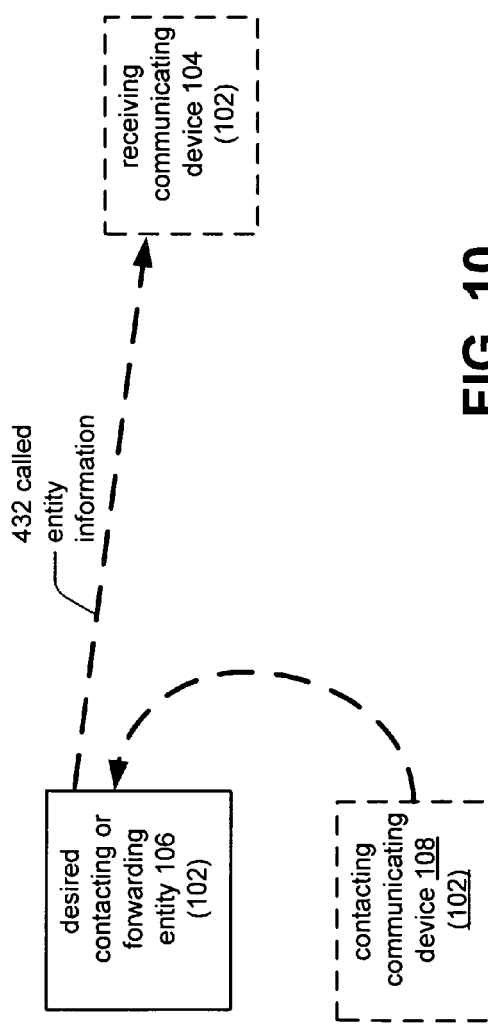

FIG. 10 configuring at least one receiving communicating device at least partially based on a called entity information at least partially describing an at least one desired contacting or forwarding entity that an at least one contacting communicating device is attempting to contact 2402 establishing a suitable response at least partially by the at least one receiving communicating device at least partially based on the called entity information at least partially describing the at least one desired contacting or forwarding entity that the at least one contacting communicating device is attempting to contact 2410 establishing a suitable response at least partially by the at least one receiving communicating device at least partially to the at least one contacting communicating device at least partially based on the at least one desired contacting or forwarding entity that the at least one contacting communicating device is attempting to contact 2412

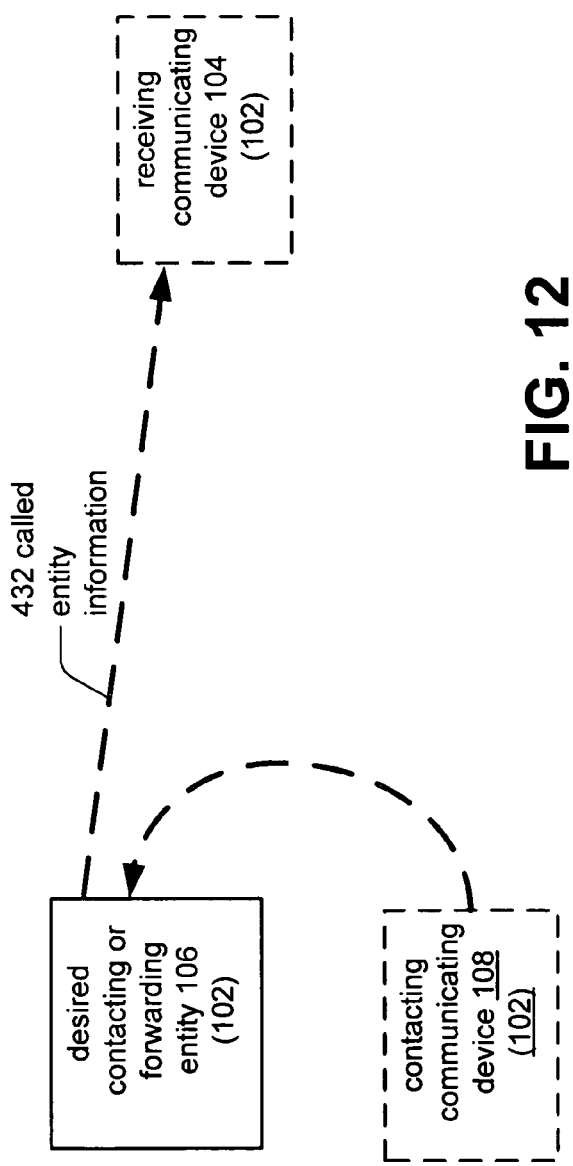

REVERSE CONTEXT SYSTEM

TECHNICAL FIELD

Certain aspects of this disclosure can relate to, but are not limited to, reverse-context mechanisms and/or techniques.

BRIEF DESCRIPTION OF THE FIGURES

FIG. 8 is a diagram of one embodiment of the reverse-context system;

FIG. 9 is a flow chart of one embodiment of a reverse-context technique;

FIG. 10 is a diagram of still another embodiment of the reverse-context system;

FIG. 11 is a flow chart of still another embodiment of a reverse-context technique;

FIG. 12 is a diagram of another embodiment of the reverse-context system;

FIG. 13 is a flow chart of another embodiment of a reverse-context technique;

DETAILED DESCRIPTION

At least certain portions of the text of this disclosure (e.g., claims and/or detailed description and/or drawings as set forth herein) can support various different claim groupings as well as different applications. Although, for sake of convenience and understanding, the detailed description can include section headings that generally track various different concepts associated with claims or general concepts contained therein, and is not intended to limit the scope of the invention as set forth by each particular claim. It is to be understood that support for the various applications or portions thereof thereby can appear throughout the text and/or drawings at one or more locations, irrespective of the section headings.

1. Certain Embodiments of a Context Indicator

Figure 1:
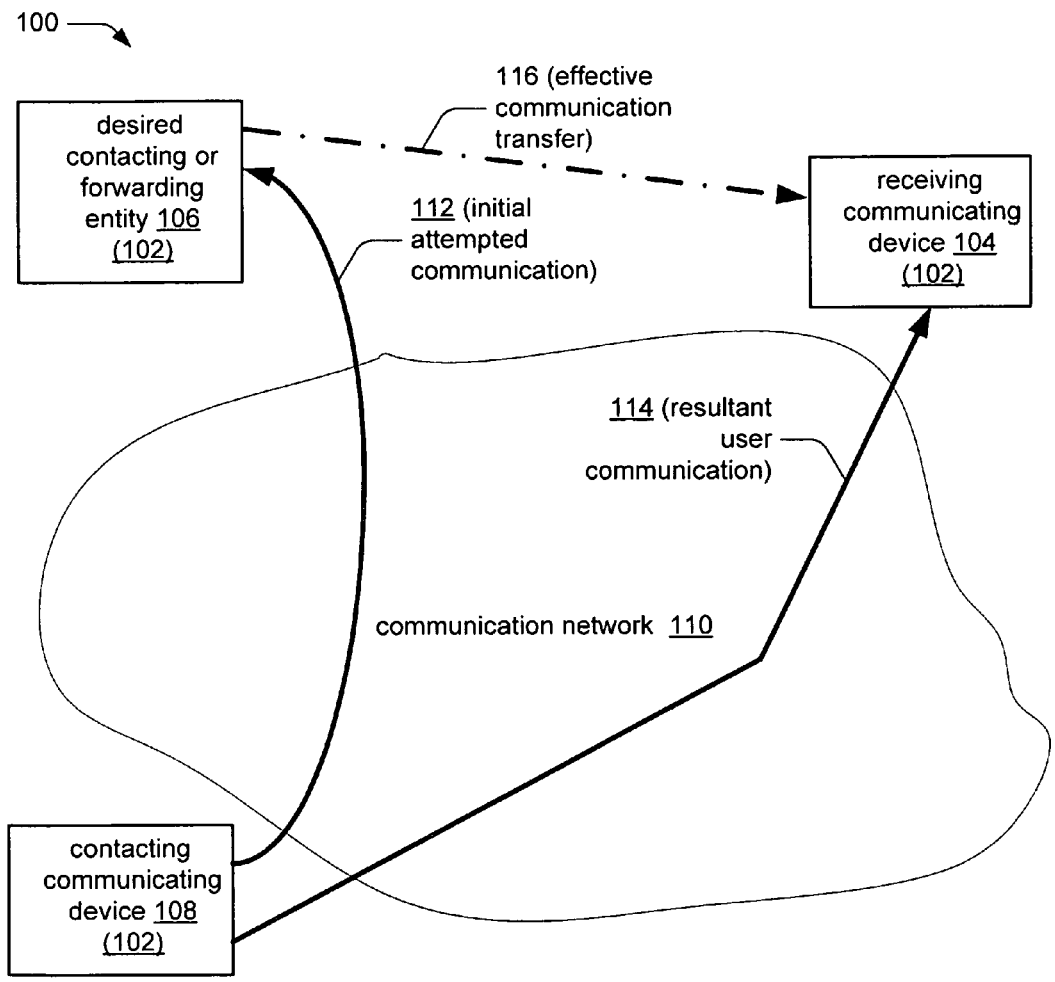
FIG. 1 is a diagram of one embodiment of a reverse-context system.

FIG. 1 shows one embodiment of a reverse-context system 100, that can be configured with a number of communicating devices 102 such that users of the communicating devices can communicate with, transmit information (such as called entity information as described in this disclosure) between, via, and/or receiving information utilizing one or more communicating devices. Examples of the reverse-context system can include, but are not limited to: phone systems, telecommunication systems, videoconferencing systems, etc. The embodiment of the reverse-context system 100 as described with respect to FIG. 1 can include, but is not limited to, a communication network 110 as well as a number of communicating devices 102. Certain embodiments of each one of the communicating device 102 can include within this disclosure, but may not be limited to, such illustrative devices as: a land-line telephone, a satellite phone, a cellular phone, a computer running a Voice Over Internet Protocol (VOIP) system along with a telephonic device, an Internet phone, a video conference device or system, a video phone, a networked phone, and other types of communicating devices that can be configured to allow communications with one or more other communicating devices 102 via the communication network 110.

Certain embodiments of the communicating device 102 can be configured as, or operate as, but are not limited to: a receiving communicating device 104, a desired contacting or forwarding entity 106, and/or a contacting communicating device 108. Within this disclosure, the receiving communicating device 104, the desired contacting or forwarding entity 106, and/or the contacting communicating device 108 can each be configured as, or operate as, based on each call or communication, at least partially distinct communicating device 102 (each communication device may be configured or constructed to be similar or dissimilar in structure and/or operation).

Certain embodiments of the communication network 110 may thereby be configured as a telephone network, a computer network, or any other type of network that can provide for communications between one or more individuals or entities that each may be associated with one or more of the similar or dissimilar communicating device 102. Certain embodiments of the contacting communicating device 108 can be configured to be able to attempt to contact the desired contacting or forwarding entity 106, such as by a phone call, etc. Within this disclosure, depending on context, certain embodiments of the reverse-context system 100 can be configured to include a number of communicating devices 102 as described in this disclosure.

Within this disclosure, the term "user or group" can indicate, depending on context, an individual or entity using the reverse-context system 100. The term "user or group" can, depending on context for each particular communication such as a call, be further subdivided into, though not limited to: a) a calling user or group that can represent those users or groups situated at or utilizing the contacting communicating device 108; or b) a receiving user or group, that can represent those users or groups situated at or utilizing the desired contacting or forwarding entity 106 and/or the receiving communicating device 104, as described with respect to FIG. 1.

Within this disclosure, a user and/or group can include, but is not limited to, a person, a business, an organization, a group, or other associated with or uses a particular communicating device. For instance, it can be assumed that a contacting user or group situated at a first communicating device (such as the contacting communicating device 108 as described with respect to FIG. 1) may attempt to contact a receiving user or group situated at one or more communicating devices (such as the desired contacting or forwarding entity 106 and/or the receiving communicating device 104 as described with respect to FIG. 1). As certain embodiments of the reverse-context system 100 become reconfigured (e.g., in a relatively fluid reconfiguration manner), so might the configuration of the associated users and/or entities.

While this disclosure describes a number of situations of individual users of groups (e.g., of humans) contacting each other such as over a telephone, VOIP, videoconference, or other such system; it is also envisioned that the reverse-context concepts can also be applicable to communications such as between distinct devices arranged within computer systems, control systems, network systems, etc., as well as their derivatives. For instance, a particular computer-based communications device that could receive communications from another computer-based communications device via a network, etc., may be configured to consider, handle, respond to, or otherwise process the transmission differently depending upon particulars of the computer-based communications device to which the original communications was intended to be directed.

There can be therefore a variety of embodiments of the communication devices configurations and operations that can be provided within certain embodiments of the reverse-context system 100. With certain embodiments of the reverse-context system 100, such as a phone network, a variety of communicating devices (and technologies associated therewith) can be utilized that are each configured to communicate with each other. For example, certain ones of the communicating devices can be configured as a plain old telephone system (POTS) phone, a cellular telephone system phone, a Voice over Internet Protocol (VOIP) phone, or as another phone technology. As such, certain embodiments of the communicating devices 102 may be intended to be configured to communicate with communicating devices of other systems (in distinct embodiments in a seamless or other manner).

Within this disclosure, the term "reverse-context" can mean, depending on context or usage, a communication system which can provide an indication at the receiving communicating device 104 of a called entity information that indicates the desired contacting or forwarding entity 106 that is attempted to be contacted by the contacting communicating device 108, during a call or communication that is being received at the receiving communicating device 104. As such, certain embodiments of the reverse-context can indicate to the receiving user or group, that may be situated at the receiving communicating device, the desired contacting or forwarding entity 106 which the contacting communicating device 108 may be attempting to contact.

Within this disclosure, the receiving communicating device 104 can include, depending on context or use, but is not limited to, that one or more phone or other communicating device that might receive a particular call or communication. In certain instances, the receiving user or group can be situated, at least at various times, at the receiving communicating device 104. Certain embodiments of the receiving communicating device 104 can receive, or otherwise generate, the called entity information that can indicate that particular desired contacting or forwarding entity 106 which the contacting communicating device 108 is attempting to contact. Certain embodiments of the receiving communicating device 104, as described within this disclosure, may be configured to indicate the reverse-context, or an identity of the desired contacting or forwarding entity 106 which the contacting communicating device 108 is attempting to contact. As such, the receiving user or group being situated at the receiving communicating device 104 can receive calls at the receiving communicating device 104, even if the original attempted communication 112 was directed to the user or group at another device, such as the desired contacting or forwarding entity 106.

Within this disclosure, the desired contacting or forwarding entity 106 can include, depending upon context or usage, but is not limited to, that one or more device, system, program, telephone, service, or other communicating mechanism that the contacting communicating device 108 is attempting to contact, for a particular call or communication. In certain instances, the desired contacting or forwarding entity 106 can be configured as a receiving communication device that can forward communications to another receiving device. In other instances, the contacting or forwarding entity can be configured as a forwarding device such as an electronic communications switchboard In certain instances, the receiving user or group can be situated, at least at various times, at the desired contacting or forwarding entity 106. As such, the contacting user or group attempting to contact such as by making a call to another user or group could likely be situated at or proximate the desired contacting or forwarding entity 106. Certain embodiments of the desired contacting or forwarding entity 106 may not be configured as a mechanism by which a receiving user or group can even receive a communication, such as an electronic answering service by which a user of a group can be contacted based on input from the contacting user or group at the contacting communicating device 108.

Within this disclosure, the contacting communicating device 108 can include, depending upon context or usage, but is not limited to, that telephone or other communicating device that is attempting to contact or communicate (from the contacting user or group) with the desired contacting or forwarding entity 106 for a particular call or communication. As such, the receiving user or group who owns or can receive communications over several phones may receive an initial attempted communication 112 at the desired contacting or forwarding entity 106. The call or communication can thereupon be transferred from the desired contacting or forwarding entity 106 to the receiving communicating device utilizing certain embodiments of the reverse-context system 100 as described in this disclosure.

Therefore, the delineation of which particular communicating devices 102 may be configured as the contacting communicating device 108, the desired contacting or forwarding entity 106, and/or the receiving communicating device 104 can vary and may not always be certain depending upon the particular users placing calls to particular other users or entities, and the particular configuration of the communicating device at any given time. Consider that a particular reverse-context system 100, along with its associated communicating devices 102, can change configuration (or have its configuration changed) such as if certain communicating devices (such as cell phones, satellite phones, videoconferencing systems, etc.) are turned off, turned on, actuated, de-actuated, and/or otherwise reconfigured.

As referenced with respect to FIG. 1, an initial attempted communication 112 can be attempted from the contacting communicating device 108 to the desired contacting or forwarding entity 106. For example, a contacting user or group at the contacting communicating device 108 may attempt to contact (e.g., by dialing the phone or connecting via VOIP or other communication network techniques) another receiving user or group believed to be situated at the desired contacting or forwarding entity 106, but is instead actually situated at the receiving communicating device 104. In certain instances, the receiving user or group associated with (e.g., owning or using) the desired contacting or forwarding entity 106 can also own or use the receiving communicating device 104. Consider certain receiving users or entities can have or use a number of communication devices, which may be of different types such as, but not limited to: a cell phone, a primary home phone, an office phone, and/or perhaps an IP phone, etc.

Certain embodiments of a user or group (that can be configured distinctly during call set-up for each particular call as either a contacting or receiving user or group) such as a business or organization, for example, may therefore utilize or have a large number of communicating devices, such that certain ones of the communicating device can be associated with a distinct individual, be directed at a distinct situation or problem (such as technical support, personnel, executives, etc.), utilize or be assigned to users that can communicate in different language(s), and/or be situated at different locations or countries. Certain users or groups, for instance, may change at least some of their communicating device(s) 102 or the associated configuration often. For instance, certain users may change their phone numbers, or actual phones often, such as to prepare for an extended trip, etc. Such communication devices that are associated with different users or groups may desire to utilize a variety of reverse-context devices, such that each individual associated with the group who receives a communication might be made aware not only of who or what group originally received the communication, but in certain embodiments a description of the subsequent communication transfers through users and/or groups.

As such, based on such reverse-context aspects, receiving users or groups, who are receiving the call or communication, can obtain the called entity information indicating the nature of the call as well as the desired contacting or forwarding entity being contacted. In certain instances, the called entity information may also include other associated information such as which may be used in combination to either properly respond to, or understand, the initial purpose of the call. As such, with certain embodiments of the communicating device 102, certain contacting user or groups from the contacting communicating device 108 may not have to go through a detailed description of the purpose of the call each time their call is transferred between the desired contacting or forwarding entity 106 and/or one or more receiving communicating device(s). Some or all of the called entity information can be provided to the receiving user or group at the receiving communicating device(s), as described in this disclosure.

With certain embodiments of the communication network, such as certain embodiments of VOIP-based phones, a variety of calls or communications can be sent either to only one of, multiple ones of, or all of a customer's, user's, or entities' phones simultaneously. For example, a user or group may have multiple phones situated in a number of diverse locations or which can be utilized for different purposes (e.g., business phone and personal phone, phones which are used to respond to callers speaking in predominantly different languages, etc.). It might be expected that, for certain embodiments of the communicating devices 102, the user or group would desire to be able to respond to calls at the communication devices at which they are situated. Additionally, it might be expected that users or groups may desire to initially respond, or communicate with contacting users or groups on different communication devices in a different manner, using a different language, for a different purpose, etc.

Within this disclosure, the term "called entity information" can pertain to information, data, graphics, acoustics, etc. which can be provided to the receiving user or group at the receiving communicating device, as can thereupon be utilized to indicate, to the receiving user or group, the desired contacting or forwarding entity that is originally receiving a current call or communication. As such, while multiple communicating devices 102 may be associated or otherwise affiliated with certain receiving users or groups, their operation, functionality, and/or use relative to those receiving users or groups may differ considerably between the different communicating devices as well as during different times, etc. The called entity information may be transferred, displayed, monitored, processed, etc. to indicate to the receiving user or group (wherever situated) that desired contacting or forwarding entity 106 at which the call or communication was directed.

Consider with respect to FIG. 1, during a time that a communication such as a phone call or videoconference is being established, the receiving user or group might be at or nearby the receiving communicating device 104, instead of at the desired contacting or forwarding entity 106 that the contacting communicating device is attempting to contact. There can thereby be confusion by the receiving user or group as to which communicating device that they own and/or use is being contacted during particular communications such as the phone ringing representing a phone call.

Certain embodiments of the establishing a call or communication can be performed relatively fluidly depending on the configuration of the reverse-context system 100 at any particular period that can change as the configuration of the reverse-context system 100 changes such as can be provided using certain computer-based signaling networks, cellular phone networks, VOIP networks, etc. In certain embodiments, the communicating devices can alternately establish a call or communication over consistent communication pathways, such as with certain embodiments of traditional fixed-wire/switch networks.

A contacting user or group that can be associated with certain embodiments of the contacting communicating device 108, that is attempting to contact a receiving user or group at the desired contacting or forwarding entity 106, could therefore with certain embodiments of the reverse-context system 100 cause the communicating device to be actuated (such as by ringing or other suitable call indication) at both the desired contacting or forwarding entity 106 and the receiving communicating device 104. At certain periods, the receiving user may be at the desired contacting or forwarding entity 106 while at other periods, the receiving user could be at the receiving communicating device 104.

Certain aspects of this disclosure may relate to indicating to the receiving user or group at that particular communicating device 102 (either 106 or 104) which the contacting user or group at the contacting communicating device 108 is attempting to contact. While there are two or more communicating devices 102 that may be associated with a particular receiving user or group (i.e., 104 and 106 as described with respect to FIG. 1), there also may be considerably more communicating devices.

For instance, a particular reverse-context system 100 as described with respect to FIG. 1 can include either one or more (e.g., a large number) of the receiving communication devices 104 and/or either one or more (e.g., a large number) of desired contacting or forwarding entities 106. In certain embodiments the communication device(s) 104 and/or 106 may be associated with, or used by, a receiving user or group as described in this disclosure. As such, in certain instances, the receiving user or group might become confused as to which communicating device 102 they are being contacted on whenever they answer one of the communication devices 104 and/or 106. Such confusion can increase as the number of communicating devices 102 that may be associated with a particular user or group increases, and also as the difference or function, language, or other aspects associated with each of the different communicating devices 102 associated with a particular user or group increases. As such, in certain aspects, the confusion associated with receiving communications such as telephone calls can increase as a number of communicating devices associated with a particular user or group increases.

Certain embodiments of the reverse-context system 100, as described with respect to FIG. 1, can thereby limit such confusion as to which communicating device 102 is being contacted or called by providing called entity information which can indicate the communicating device 102 which is possessed or used by the receiving user or group with which the contacting communicating device 108 is attempting to communicate.

FIG. 1 shows one embodiment of an effective communication transfer 116 that can exist when a contacting user or group contacts the receiving user or group at the desired contacting or forwarding entity 106 with the initial attempted communication 112. In certain instances, the attempted communication can, instead, transfer to the receiving communicating device 104 as indicated by the effective communication transfer 116 to thereby establish the resultant user communication 114.

There may be a variety of reasons why a user, or a mechanism, at the receiving communicating device 104 might be interested in discerning the reverse-context aspects associated with received communications, such as discerning which desired contacting or forwarding entity 106 or receiving communicating device 104 the contacting communicating device 108 may be attempting to communicate. For example, since the receiving user or group might have multiple phones situated at different locations, in different countries, with different phone numbers, for different purposes (one might be for professional use, another for private use), for receiving calls from users who speak different languages, etc.

Certain embodiments of the communication device 102 can include, but is not limited to, a communication mechanism 202, a communication indicator/display 204, a reverse context indicator 206, and/or a communication controller 97. Certain embodiments of the communication mechanism 202 can be configured to provide communications (e.g., telephone, VOIP, computer-based device, etc.) between the communicating devices associated with the call or communication, as described with respect to FIG. 1.

Certain embodiments of the communication indicator/display 204 can illustrate information or data relating to phone calls, stored numbers, communications, etc. One embodiment of the communication indicator/display 204 can be configured similar to a display for a cellular, VOIP, POTS, or other phone. Certain embodiments of the communication indicator/display 204 can include a video, LCD, LED, alphanumerical, or other display, and alternately may include an audio statement (e.g., identifying a caller, e.g., Mom, who is calling on a particular desired contacting or forwarding entity 106, such as the receiving user's or group's home phone).

Figure 4:
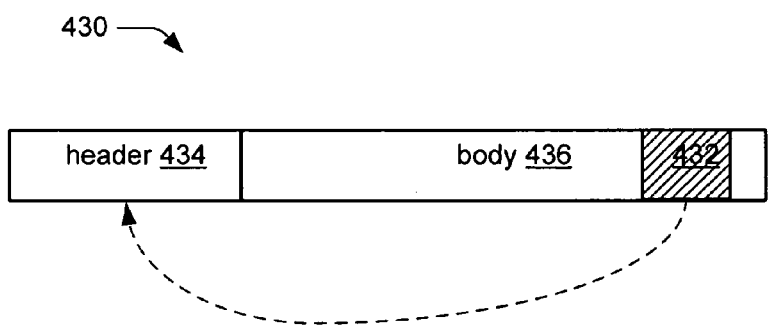
FIG. 4 is a diagram of one embodiment of a called entity information.
Figure 5:
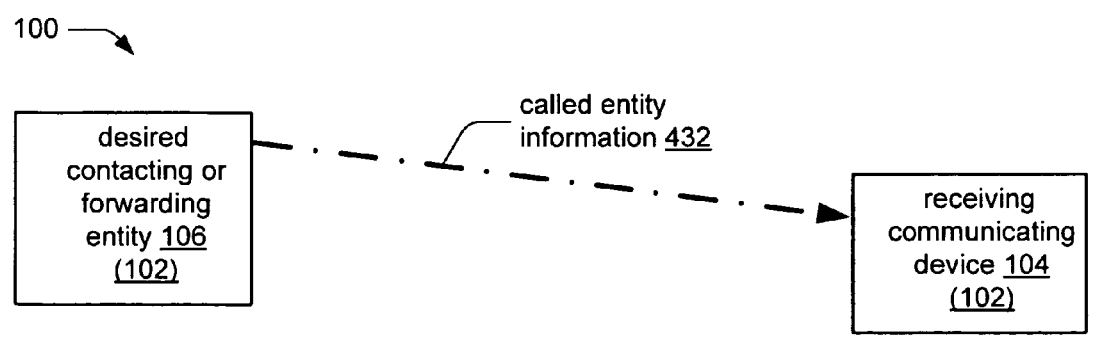
FIG. 5 is a diagram of one embodiment of the reverse-context system.

Certain embodiments of the reverse context indicator 206 can display or otherwise indicate at least a portion of the called entity information, as described in this disclosure with respect to FIGS. 4, 5, and at other locations. As such, the reverse context indictor can in certain instances display or otherwise indicate to one or more receiving communication device(s) 104 an indication of the desired contacting or forwarding entity 106. In certain embodiments, the reverse context indictor 206 can be integrated partially or entirely within the communication indicator/display 204, or alternately can be entirely separated there from.

Within this disclosure, the session initiation protocol (herein referred to as "SIP"), is the IETF protocol for VOIP and other text and multimedia sessions, like instant messaging, video, online games and other services. Other communicating devices 102 can utilize other initiation, maintaining, and/or terminating protocols from SIP, and therefore SIP should be considered as one embodiment of communicating protocol. Certain embodiments of the SIP protocol can be intended to provide ringing functionality to phones (e.g., make phones ring), as well as in certain instances provide a variety of signaling, call set-up, call terminating, and other functionality. Certain embodiments of the functionality of SIP, as mentioned in the SIP RFC 3261, can be considered as an application-layer control (signaling) protocol for creating, modifying, and terminating sessions with one or more participants. These sessions can include Internet telephone calls, multimedia distribution, and multimedia conferences.

SIP invitations can be used to create (or in certain instances modify) sessions and carry session descriptions that allow participants to agree on a set of compatible media types. SIP makes use of elements called proxy servers to help route requests to the user's current location, authenticate and authorize users for services, implement provider call-routing policies, and provide features to users. SIP can also provide a registration function that allows users to upload their current locations for use by proxy servers. SIP can be configured or designed to run on top of a number of different transport protocols. RFC 3261 is thereby incorporated in its entirety by reference herein to provide an example of a suitable protocol.

While SIP is provided as an example of a protocol that provides or allows for communications between a number of communicating devices, it should be emphasized that a variety of derivative or alternative protocols can be utilized to provide communications to a single user or group over a variety of communicating device(s) 102. As communication setup, communication transfer, and other associated technology improves; a variety of mechanisms may be provided by which an individual can receive calls for multiple phones on each, or one or more, phones. Certain embodiments of VOIP communications, for example, can utilize SIP techniques and mechanisms, as described in this disclosure, to establish, maintain, and break down such communications. Vonage, for example, which is a service provider for VOIP technology can provide a call-blasting service which may be referred to as "Blast Me", by which a caller at the contacting communicating device 108 can contact a single user or group situated at multiple phone lines.

"Blast Me", thereby represents a solution that is provided by certain VOIP systems (e.g., Vonage-based) such that a number of VOIP phones are rung at different locations simultaneously. "Blast-Me" can be considered as an example of a SIP-enabled service that can feature "wired-to-wireless integration". Such an integration is especially desirable since many (e.g., receiving) users or groups can have a number of communicating devices such as phones, each of which may be of a different type and/or may have one or more different uses, such as, for example: a cell phone, a primary home phone, an office phone, and perhaps an IP phone. With such multiple receiving communicating devices, calls or other communications can be sent to all of the users, entities, and/or customer's phones simultaneously. As such, as relating to the reverse-context system 100 of FIG. 1, the contacting communicating device 108 (by attempting to contact the desired contacting or forwarding entity 106) can contact both the desired contacting or forwarding entity 106 and the receiving communicating device 104.

Figure 3:
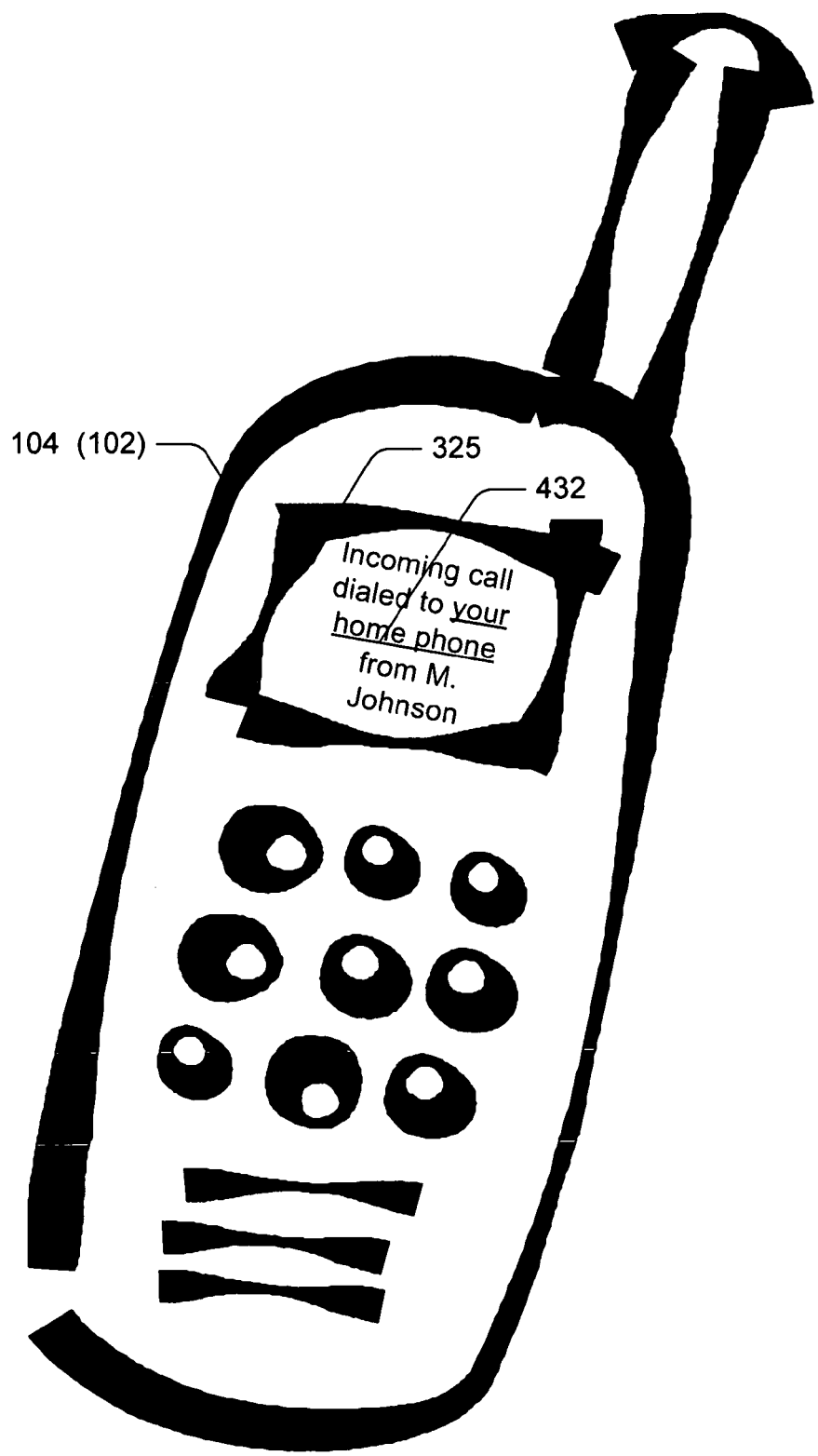
FIG. 3 is a diagram of one embodiment of the communicating device.

A number of embodiments of the reverse context system 100 can include, but are not limited to, a reverse-context telephony display or management mechanism 325 in which the receiving communicating device 104 can be described with respect to FIG. 3. One embodiment of the reverse-context telephony display or management mechanism 325 could be associated with certain embodiments of the receiving communication device 104 (e.g., a cellular phone, VOIP phone, etc.) is described with respect to FIG. 3, in which the reverse context is illustrated by the call being made to the home phone. Certain embodiments of the reverse-context telephony display or management mechanism 325 can include, for example, a display such as a liquid crystal display (LCD), light emitting diode (LED), alphanumerical display, or other suitable display, etc. that can be applied to the receiving communicating device.

Certain embodiments of the reverse-context telephony display or management mechanism 325 can display, for example, certain embodiments of the called entity information 432 as described as underlined with respect to FIG. 3, and with respect to FIGS. 5, 6, 8, and 10. The configuration of certain embodiments of the called entity information 432 can change during signal transfer, processing, display, etc. For example, certain embodiments of the called entity information 432 can be configured as data, or other information, which can be transferred between one or more communication device(s), or also between other devices or entities. By comparison, certain embodiments of the called entity information 432 can be configured as data or alphanumerical text that can be displayed on a graphical user interface, such as described with respect to FIG. 3.

Certain embodiments of the reverse-context telephony display or management mechanism 325 can change their state or display based on the state of the receiving communicating device 104. For example, if certain embodiments of the communication device 102 are being used as the contacting communicating device 108 to, e.g., place a communication, certain embodiments of the reverse-context telephony display or management mechanism 325 can illustrate the phone number, or other information such as the called entity information being contacted, relating to the particular receiving communicating device 104 being contacted by the contacting communicating device 108. If certain embodiments of the communicating device 102 are configured as the desired contacting or forwarding entity 106, then the desired contacting or forwarding entity can transfer the called entity information to another desired contacting or forwarding entity 106 or alternately to the receiving communicating device 104. If certain embodiments of the communicating device 102 are configured as the receiving communicating device 104, they can, e.g., receive the called entity information via the desired contacting or forwarding entity 106, and display the called entity information or derived information on the reverse-context telephony display or management mechanism 325.

In certain embodiments, one aspect of the reverse-context system might involve being that the reverse-context system 100 indicates to the user not only who is calling, but what communicating device the contacting user or group thinks they are contacting using a modified signaling caller identifier. Certain embodiments of the original signaling caller identifier can indicate an identity of an individual or entity attempting to establish a communication. Certain embodiments of the modified signaling caller identifier can indicate the desired contacting or forwarding entity 106 that the contacting communicating device 108, as described with respect to FIG. 1, is attempting to contact. For example: does a particular contacting user or group think they are contacting the user at a different location then the user is actually situated? Is a particular contacting user or group contacting a receiving user or group for personal or business purposes? Certain embodiments of the reverse-context system may answer such questions entirely, while other embodiments can provide an indication or some useful information. There can be therefore a considerable amount of information that may be desired by a receiving caller using certain embodiments of the reverse-context 100.

One aspect with certain embodiments of reverse-context system carriers, such as may rely upon VOIP systems, such as Vonage, is that such reverse-context systems can utilize the VOIP carrier or logic associated therewith, and could map various logical relationships between various telephony numbers and various persons. Certain embodiments of reverse-context systems can even utilize different protocols between different communicating devices. For example, the desired contacting or forwarding entity 106 can interface within the reverse-context system 100 utilizing a varied phone numbering system (e.g., with differing communicating devices such as phones perhaps having different formats and/or number of digits, etc.). As such, certain embodiments of reverse-context system 100 can, for example, utilize a proliferation of "telephone" numbers having various formats and lengths that will vary greatly, in certain embodiments, because modern telephony systems may no longer be tied to geography the way the old POTS numbering system was. Additionally, certain embodiments of SIP can provide various addressing modes that give functionality.

In addition, certain VOIP carriers such as Vonage can provide a feature wherein the reverse-context system 100 can automatically dial all telephony "numbers" associated with the person, user, or group. As such, if the carrier forwards a call to the receiving user or group, it also can forward the number or other device identifier that was originally being contacted. A variety of automated voice handling mechanisms, as described in this disclosure, can be provided that can operate based, at least in part, on the phone number actually dialed in those instances that the desired contacting or forwarding entity 106 that is being attempted to be contacted differs from the receiving communicating device 104 at which the user or group is situated and may answer the communication. For example, voicemail or other message language or dialect can be selected based at least in part on the desired contacting or forwarding entity 106 as compared with the receiving communicating device 104.

As such, certain embodiments of the reverse-context system might indicate the number, location, or other identifier of the communication device that the calling user or group thinks they are calling (e.g., your mother is calling on your home phone). Consider, for example, a receiving user or group being situated at the receiving communicating device 104 at a location where the receiving user or group may desire to know where the contacting user or group that is contacting them may wish to contact, it might be useful to determine where a received communication has been initially directed.

FIG. 4 shows one embodiment of a communication packet 430 that can be transferred between a number of the communication device(s) 102 that can include a called entity information 432 as described in this disclosure, a packet header 434, and a packet body 436. While the called entity information 432 is illustrated in FIG. 4 as a portion of the packet body 436 in FIG. 4, it is envisioned that certain embodiments of the communication packet can also include the called entity information as a portion of the packet header 434. In certain embodiments, the communication packet 430 can be configured as a VOIP packet, a Plain Old Telephone System (POTS) packet, an internet communication packet, a videoconference packet, or other types of communication packet.

Certain embodiments of the called entity information 432 can be utilized to determine which desired contacting or forwarding entity 106 was originally contacted by the contacting communicating device 108. The identity of the desired contacting or forwarding entity 106 can be determined using a variety of techniques. In one embodiment, the first communicating device 102 that is possessed, owned, used, or controlled by a particular user or group may be assigned to be the desired contacting or forwarding entity 106.

In certain embodiments, the desired contacting or forwarding entity 106 can forward the caller identity (caller ID) received from the contacting communicating device 108, the communication network 110, or the reverse context system 100 as described with respect to FIG. 1 to the receiving communicating device 104, as can be included with one embodiment of the called entity information 432 as described with respect to FIGS. 4 and/or 5. In other embodiments, the desired contacting or forwarding entity 106 can forward the called entity information 432 to each one of the receiving communicating device(s) 104 that may be associated with the receiving user or group for a particular call or communication. Thereupon, the desired contacting or forwarding entity 106 and the each one of the receiving communicating device(s) 104 can undergo ringing or otherwise alerting the receiving user or group.

Following the assignment of the desired contacting or forwarding entity 106, the desired contacting or forwarding entity 106 can thereupon forward the called entity information 432, as described with respect to FIG. 5, to each receiving communicating device 104 using a broadcast or more directed technique. As within certain embodiments of the reverse-context system 100, the one or more receiving communicating device 104 receives the called entity information 432 from the desired contacting or forwarding entity 106, the desired contacting or forwarding entity 106 as well as the one or more receiving communicating device 104 can each ring, as well as display, project, provide as audio, and/or otherwise indicate at least a portion of the called entity information 432 at one or more of the communicating devices 102. Such display or otherwise providing the called entity information at one or more of the communicating devices 102 as the desired contacting or forwarding entity 106 and/or the receiving communicating device 104 can be automated, or selected by a particular user. For example, certain communicating devices can be configured with a button that when pressed, indicates at least a portion of the called entity information 432.

The embodiment of the transfer of the called entity information as described with respect to FIGS. 4 and/or 5 may relate to VOIP, computer telephone, or other computer-based phone systems, and may also relate to more conventional signaling-based phone systems. For instance, in certain embodiments, the effective communication transfer 116 as described with respect to FIG. 1 can include, but is not limited to, a transfer signal that can be configured to transfer the called entity information 432 from the desired contacting or forwarding entity 106 to the receiving communicating device(s) 104.

2. Certain Embodiments of the Communication Controller

Figure 2:
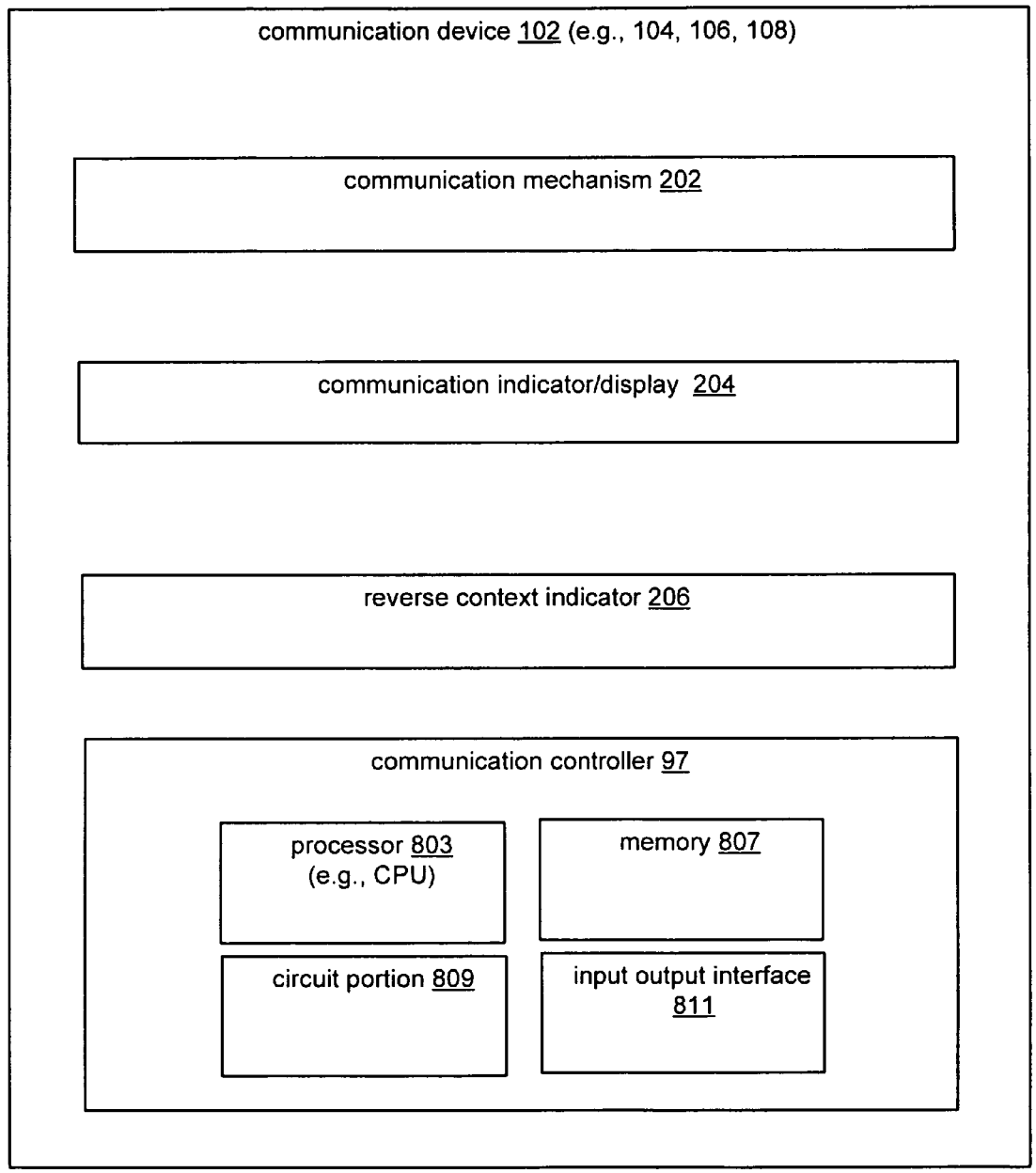
FIG. 2 is a block diagram of one embodiment of a communicating device.

This disclosure describes a number of embodiments of the communication controller 97 as described with respect to FIG. 2 that are intended to control operations of the reverse-context system 100. Certain embodiments of the communication controller 97 can act as and is provided the functionality of the at least a portion of the feedback mechanism to either certain embodiments of the communication device 102 as integrated within and/or utilizing the reverse-context system 100, as described with respect to FIG. 1. FIG. 2 shows a block diagram of certain respective embodiments of the reverse-context system 100 that can include the communication controller 97.

Certain embodiments of the reverse-context system 100 thereby can include, but are not limited to, any particular configuration of the communication controller 97. Certain embodiments of the communication controller 97 can be computer based, controller based, mote based, cellular telephone-based, and/or electronics based. Certain embodiments of the communication controller can be segmented into modules, and can utilize a variety of wireless communications and/or networking technologies to allow information, data, etc. to be transferred to the various distinct portions or embodiments of the reverse-context system 100. Certain embodiments of the communication controller 97 can be configured as a unitary or stand alone device.

Certain embodiments of the communication controller 97 can vary as to their automation, complexity, and/or sophistication; and can be utilized to control, setup, establish, and/or maintain communications between a number of communicating devices. As described within this disclosure, multiple ones of the different embodiments of the reverse-context system 100 can transfer information or data relating to the communication link to or from a remote location and/or some intermediate device as might be associated with communication, monitoring and/or other activities.

Certain embodiments of the communication controller 97, as well as certain embodiments of the reverse-context system 100 (in general), can utilize distinct firmware, hardware, and/or software technology. For example, mote-based technology, microprocessor-based technology, microcomputer-based technology, general-purpose computer technology, specific-purpose computer technology, Application-Specific Integrated Circuits, and/or a variety of other computer technologies can be utilized for certain embodiments of the communication controller 97, as well as certain embodiments of the reverse-context system 100.

Certain embodiments of the communication controller 97 can as described with respect to FIG. 1 can include a processor 803 such as a central processing unit (CPU), a memory 807, a circuit or circuit portion 809, and an input output interface (I/O) 811 that may include a bus (not shown). Certain embodiments of the communication controller 97 of the reverse-context system 100 can include and/or be a portion of a general-purpose computer, a specific-purpose computer, a microprocessor, a microcontroller, a personal display assistant (PDA), a cellular phone, a wireless communicating device, a hard-wired phone, and/or any other known suitable type of communications device, computer, and/or controller that can be implemented in hardware, software, electromechanical devices, and/or firmware. Certain embodiments of the processor 803, as described with respect to FIG. 1, can perform the processing and arithmetic operations for certain embodiments of the communication controller 97 of the reverse-context system 100. Certain embodiments of the communication controller 97 of the reverse-context system 100 can control the signal processing, database querying and response, computational, timing, data transfer, and other processes associated with certain embodiments of the communication controller 97 of the reverse-context system 100.

Certain embodiments of the memory 807 of the communication controller 97 can include a random access memory (RAM) and/or read only memory (ROM) that together can store the computer programs, operands, and other parameters that control the operation of certain embodiments of the communication controller 97 of the reverse-context system 100. The memory 807 can be configurable to contain information obtained, retained, or captured by that particular communication controller 97 of the reverse-context system 100.

Certain embodiments of the bus can be configurable to provide for digital information transmissions between the processor 803, circuits 809, memory 807, I/O 811, and/or the image memory or storage device (which may be integrated or removable). In this disclosure, the memory 807 can be configurable as RAM, flash memory, semiconductor-based memory, of any other type of memory that can be configurable to store data pertaining to images. The bus also connects I/O 811 to the portions of certain embodiments of the communication controller 97 of either the reverse-context system 100 that can either receive digital information from, or transmit digital information to other portions of the reverse-context system 100, or other systems and/or networking components associated with.

Certain embodiments of the communication controller 97 of the reverse-context system 100, as described with respect to FIG. 1, can include a transmitter portion (not shown) that can be either included as a portion of certain embodiments of the communication controller 97 of the reverse-context system 100. Certain embodiments of the communication controller 97 can alternately be provided as a separate unit (e.g., microprocessor-based). In certain embodiments, the transmitter portion can transmit image information between certain embodiments of the communication controller 97 of the reverse-context system 100.

Certain embodiments of the communication controller 97 of the reverse-context system 100 as described with respect to FIG. 1 can include an operation altering portion (not shown) that can be either included as a portion of certain embodiments of the communication controller 97 of the reverse-context system 100, or alternately can be provided as a separate unit (e.g., microprocessor-based).

Certain embodiments of the memory 807 can provide one example of a memory storage portion. In certain embodiments, the monitored value includes but is not limited to: a percentage of the memory 807, an indication of data that is or can be stored in the memory 807, or for data storage or recording interval. To provide for overflow ability for the memory 807 of certain embodiments of the communication controller 97 of the reverse-context system 100, a secondary storage device can be operably coupled to the memory 807 to allow a controllable transmitting of memory data from certain embodiments of the communication controller 97 of the reverse-context system 100 when the monitored value of data or other information within the memory 807 exceeds a prescribed value. The prescribed value can include, e.g., some percentage amount or some actual amount of the value.

In certain embodiments, a secondary communication link can be established between the certain embodiments of the communication controller 97 of the reverse-context system 100. The secondary communication link can be structured similar to as a communication link, or alternatively can utilize network-based computer connections, Internet connections, etc. to provide information and/or data transfer between certain embodiments of the communication controller 97 of the reverse-context system 100.

In certain embodiments of the communication controller 97 of the reverse-context system 100, the particular elements of certain embodiments of the communication controller 97 of the reverse-context system 100 (e.g., the processor 803, the memory 807, the circuits 809, and/or the I/O 811) can provide a monitoring function to convert raw data as displayed by an indicator. A monitoring function as provided by certain embodiments of the communication controller 97 of the reverse-context system 100 can be compared to a prescribed limit, such as whether the number of images contained in the memory 807, the amount of data contained within the memory 807, or some other measure relating to the memory is approaching some value. The limits to the value can, in different embodiments, be controlled by the user or the manufacturer of certain embodiments of the communication controller 97 of the reverse-context system 100. In certain embodiments, the memory 807 can store such information as data, information, displayable information, readable text, motion images, video images, and/or audio images, etc.

In certain embodiments, the I/O 811 provides an interface to control the transmissions of digital information between each of the components in certain embodiments of the communication controller 97 of the reverse-context system 100. The I/O 811 also provides an interface between the components of certain embodiments of the communication controller 97 of the reverse-context system 100. The circuits 809 can include such other user interface devices as a display and/or a keyboard. In other embodiments, the communication controller 97 of the reverse-context system 100 can be constructed as a specific-purpose computer such as an application-specific integrated circuit (ASIC), a microprocessor, a microcomputer, or other similar devices.

3. Certain Embodiments of Reverse-Context System with Relevant Flowcharts

Within the disclosure, flow charts of the type described in this disclosure apply to method steps as performed by a computer or controller. The flow charts can also apply to apparatus devices, such as an antenna or a node associated therewith that can include, e.g., a general-purpose computer or specialized-purpose computer whose structure along with the software, firmware, electromechanical devices, and/or hardware, can perform the process or technique described in the flow chart.

Figure 6:
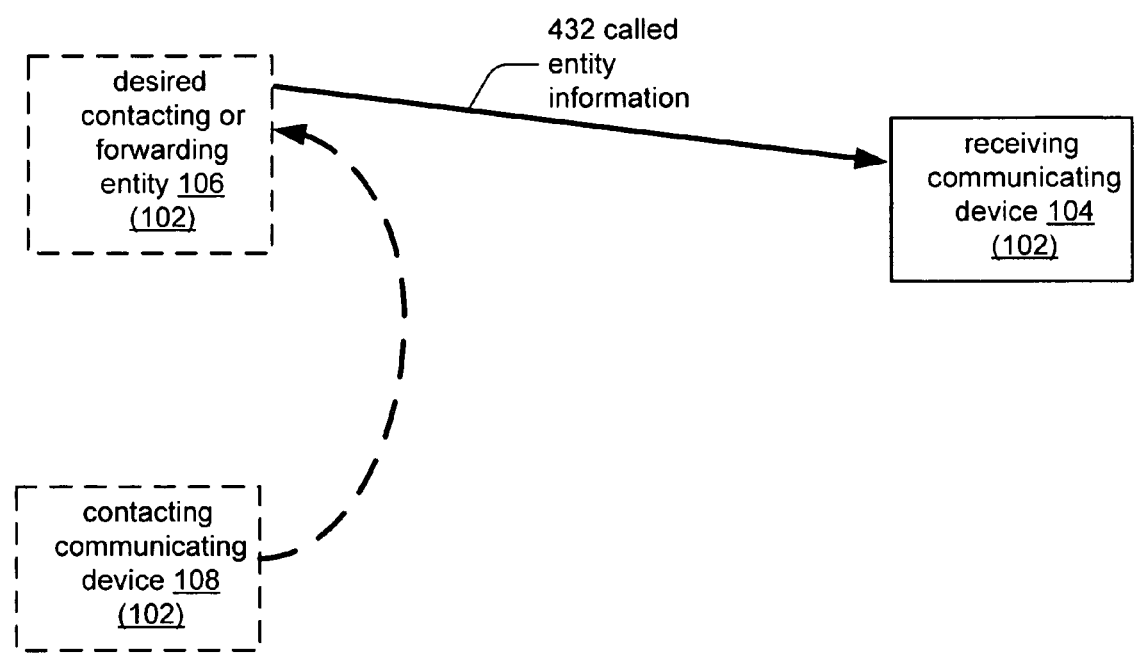
FIG. 6 is a diagram of one embodiment of the reverse-context system.

FIG. 6 shows one embodiment of a reverse-context system 100 that indicates, at least partially relative to the at least one receiving communicating device 104 as described with respect to FIGS. 1-5, the called entity information 432 as described with respect to FIGS. 3, 4, and 5, at least partially indicating an at least one desired contacting or forwarding entity 106 that an at least one contacting communicating device is attempting to contact.

Figure 7A:
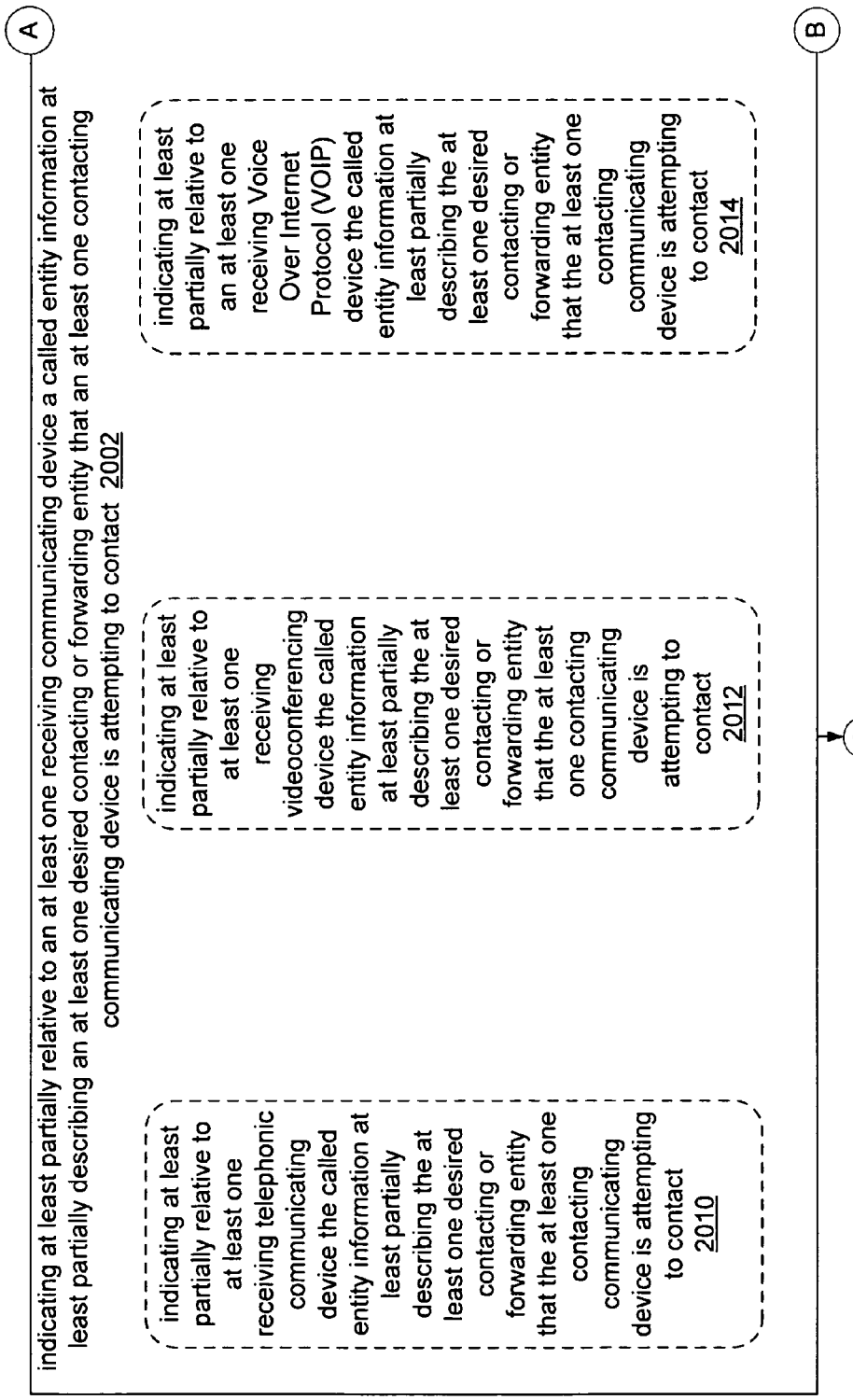
FIG. 7 (including FIGS. 7a, 7b, and 7c) is a flow chart of one embodiment of a reverse-context technique.
Figure 7C:
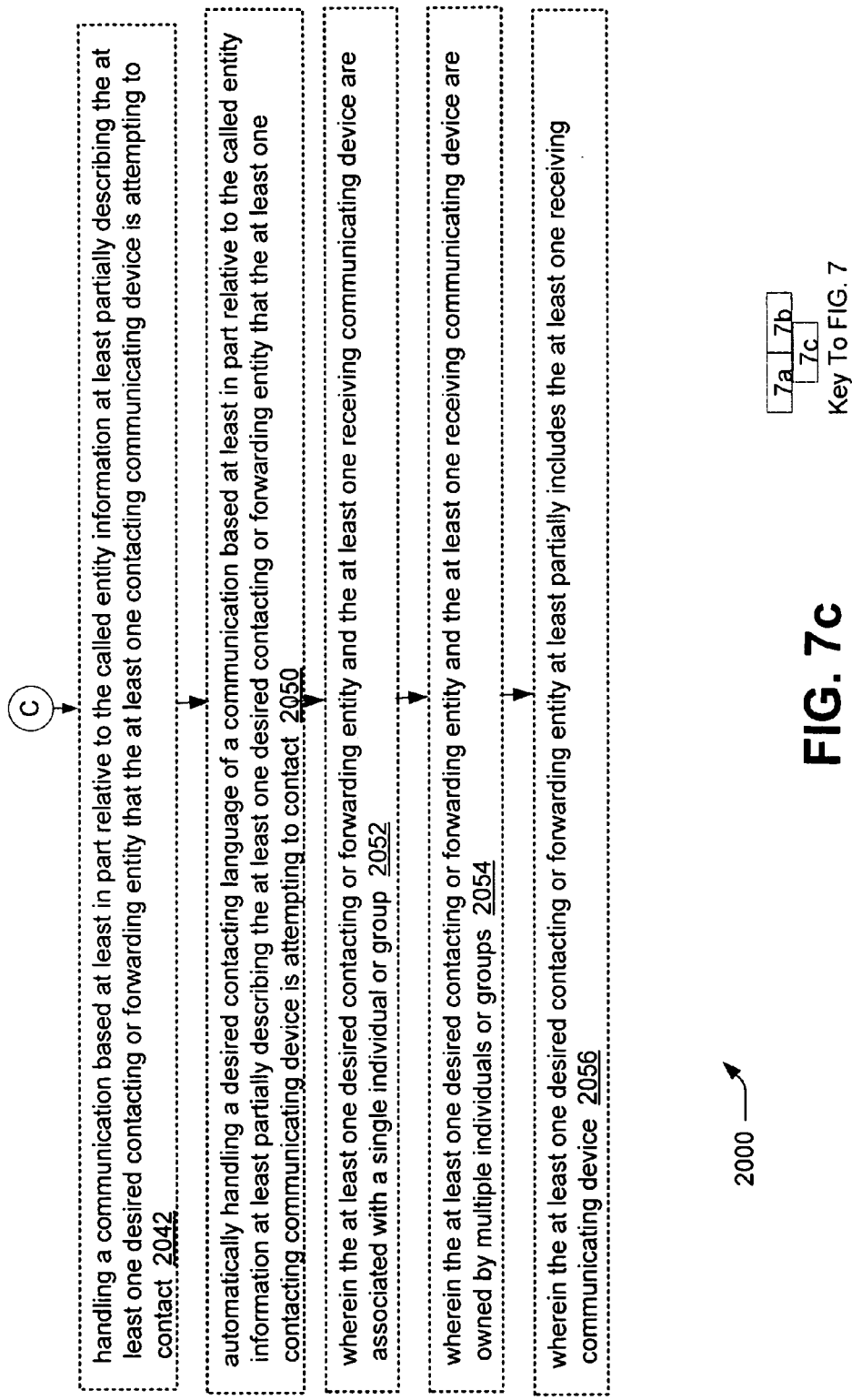

One embodiment of a high-level flowchart of a reverse-context technique 2000 is described with respect to FIG. 7 (including FIGS. 7a, 7b, and 7c) and can include, but is not limited to, operations 2002 and optional operations 2042, 2050, 2052, 2054, and/or 2056. One embodiment of operation 2002 can include, but is not limited to, optional operations 2010, 2012, 2014, 2016, 2018, and/or 2020. The high-level flowchart of FIG. 7 (including FIGS. 7a, 7b, and/or 7c) should be considered in combination with the embodiments of the reverse-context system 100, as described with respect to FIGS. 2, and/or 6. One embodiment of operation 2002 can include, but is not limited to, indicating at least partially relative to an at least one receiving communicating device a called entity information at least partially describing an at least one desired contacting or forwarding entity that an at least one contacting communicating device is attempting to contact. For example, indicating (e.g., on a display, using a ring tone, vie an audio indication, etc.) the called entity information relative to the at least one receiving communicating device which at least partially describes an at least one desired contacting or forwarding entity that an at least one contacting communicating device is attempting to contact. One embodiment of the indicating at least partially relative to an at least one receiving communicating device a called entity information at least partially describing an at least one desired contacting or forwarding entity that an at least one contacting communicating device is attempting to contact of operation 2002 can include operation 2010, that can include but is not limited to, indicating at least partially relative to at least one receiving telephonic communicating device the called entity information at least partially describing the at least one desired contacting or forwarding entity that the at least one contacting communicating device is attempting to contact. For example, the receiving communicating device at least partially includes a telephone. One embodiment of the indicating at least partially relative to an at least one receiving communicating device a called entity information at least partially describing an at least one desired contacting or forwarding entity that an at least one contacting communicating device is attempting to contact of operation 2002 can include operation 2012, that can include but is not limited to, indicating at least partially relative to at least one receiving videoconferencing device the called entity information at least partially describing the at least one desired contacting or forwarding entity that the at least one contacting communicating device is attempting to contact. For example, the receiving communicating device at least partially includes a videoconference device. One embodiment of the indicating at least partially relative to an at least one receiving communicating device a called entity information at least partially describing an at least one desired contacting or forwarding entity that an at least one contacting communicating device is attempting to contact of operation 2002 can include operation 2014, that can include but is not limited to, indicating at least partially relative to an at least one receiving Voice Over Internet Protocol (VOIP) device the called entity information at least partially describing the at least one desired contacting or forwarding entity that the at least one contacting communicating device is attempting to contact. For example, the receiving communicating device at least partially includes a VOIP device. One embodiment of the indicating at least partially relative to an at least one receiving communicating device a called entity information at least partially describing an at least one desired contacting or forwarding entity that an at least one contacting communicating device is attempting to contact of operation 2002 can include operation 2016, that can include but is not limited to, indicating at least partially using a display at least partially relative to the at least one receiving communicating device the called entity information at least partially describing the at least one desired contacting or forwarding entity that the at least one contacting communicating device is attempting to contact. For example, displaying the called entity information, or some information derived there from. One embodiment of the indicating at least partially relative to an at least one receiving communicating device a called entity information at least partially describing an at least one desired contacting or forwarding entity that an at least one contacting communicating device is attempting to contact of operation 2002 can include operation 2018, that can include but is not limited to, indicating at least partially using a voice prompt at least partially relative to the at least one receiving communicating device the called entity information at least partially describing the at least one desired contacting or forwarding entity that the at least one contacting communicating device is attempting to contact. For example, For example, providing a voice prompt to provide the called entity information, or at least a portion thereof. One embodiment of the indicating at least partially relative to an at least one receiving communicating device a called entity information at least partially describing an at least one desired contacting or forwarding entity that an at least one contacting communicating device is attempting to contact of operation 2002 can include operation 2020, that can include but is not limited to, indicating at least partially using a computer-based device at least partially relative to the at least one receiving communicating device the called entity information at least partially describing the at least one desired contacting or forwarding entity that the at least one contacting communicating device is attempting to contact. For example, utilizing the computer-based device to indicate the called entity information. One embodiment of operation 2042 can include, but is not limited to, handling a communication based at least in part relative to the called entity information at least partially describing the at least one desired contacting or forwarding entity that the at least one contacting communicating device is attempting to contact. For example, allowing a receiving user or group to handle the communication (e.g., answer a phone call, receive an email, obtain a signal, etc.) based at least in part on the called entity information. One embodiment of operation 2050 can include, but is not limited to, automatically handling a desired contacting language of a communication based at least in part relative to the called entity information at least partially describing the at least one desired contacting or forwarding entity that the at least one contacting communicating device is attempting to contact. For example, allowing an automated device to handle the communication (e.g., answer a phone call, save or transfer an email or other communication, receive a signal, etc.) based at least in part on the called entity information. One embodiment of operation 2052 can include, but is not limited to, wherein the at least one desired contacting or forwarding entity and the at least one receiving communicating device are associated with a single individual or group. For example, wherein the desired contacting or forwarding entity and the receiving communication device is associated with a single user, person, or group, etc. One embodiment of operation 2054 can include, but is not limited to, wherein the at least one desired contacting or forwarding entity and the at least one receiving communicating device are owned by multiple individuals or groups. For example, wherein the desired contacting or forwarding entity and the receiving communication device is associated with a number of users, people, or groups, etc. One embodiment of operation 2056 can include, but is not limited to, wherein the at least one desired contacting or forwarding entity at least partially includes the at least one receiving communicating device. For example, the receiving device is, or is included in, the at least one desired contacting or forwarding entity. The order of the operations, methods, mechanisms, etc. as described with respect to FIG. 7 (including FIGS. 7a, 7b, and/or 7c) is intended to be illustrative in nature, and not limited in scope.

FIG. 8 shows one embodiment of the reverse-context system 100 that indicates, at least partially relative to the at least one receiving communicating device 104 as described with respect to FIGS. 1-5, the called entity information 432 as described with respect to FIGS. 3, 4, and 5, at least partially determining an at least one desired contacting or forwarding entity 106 that an at least one contacting communicating device is attempting to contact.

One embodiment of a high-level flowchart of the reverse-context technique 2200 is described with respect to FIG. 9 and can include, but is not limited to, operation 2202. The high-level flowchart of FIG. 9 should be considered in combination with the embodiments of the reverse-context system 100, as described with respect to FIGS. 2, and/or 8. One embodiment of operation 2202 can include, but is not limited to, determining at least partially at a receiving communicating device a called entity information at least partially describing a desired contacting or forwarding entity that a contacting communicating device is attempting to contact, in which the receiving communicating device and at least one other telephonic device is associated with a single individual or group, and wherein the receiving communicating device and the at least one other telephonic device can receive communications from the contacting communicating device. For example, determining at least partially at a receiving communicating device a called entity information at least partially describing a desired contacting or forwarding entity that a contacting communicating device is attempting to contact. In certain embodiments, the determining can be done by the receiving user or group as described in this disclosure, while in other embodiments the determining can be performed automatically or partially automatically, such as with the use of a computer or controller. The order of the operations, methods, mechanisms, etc. as described with respect to FIG. 9 is intended to be illustrative in nature, and not limited in scope.

FIG. 10 shows one embodiment of the reverse-context system 100 in which the at least one receiving communicating device at least partially transmits a called entity information at least partially describing an at least one desired contacting or forwarding entity that an at least one contacting communicating device is attempting to contact.

One embodiment of a high-level flowchart of a telephony technique 2400 is described with respect to FIG. 11 and can include, but is not limited to, operation 2402. One embodiment of operation 2402 can include, but is not limited to, operations 2410 and 2412. The high-level flowchart of FIG. 11 should be considered in combination with the embodiments of the reverse-context system 100, as described with respect to FIGS. 2, and/or 10. One embodiment of operation 2402 can include, but is not limited to, configuring at least one receiving communicating device at least partially based on a called entity information at least partially describing an at least one desired contacting or forwarding entity that an at least one contacting communicating device is attempting to contact. For example, configuring at least one receiving communicating device at least partially based on a called entity information, such as by displaying an indication of the at least one desired contacting or forwarding entity that the at least one contacting communicating device is attempting to contact. One embodiment of the configuring at least one receiving communicating device at least partially based on a called entity information at least partially describing an at least one desired contacting or forwarding entity that an at least one contacting communicating device is attempting to contact of operation 2402 can include operation 2410, that can include, but is not limited to, establishing a suitable response at least partially by the at least one receiving communicating device at least partially based on the called entity information at least partially describing the at least one desired contacting or forwarding entity that the at least one contacting communicating device is attempting to contact. For example, determining to establish a communication at least partially using the receiving communicating device at least partially based on the called entity information. One embodiment of the configuring at least one receiving communicating device at least partially based on a called entity information at least partially describing an at least one desired contacting or forwarding entity that an at least one contacting communicating device is attempting to contact of operation 2402 can include operation 2412, that can include, but is not limited to, establishing a suitable response at least partially by the at least one receiving communicating device at least partially to the at least one contacting communicating device at least partially based on the at least one desired contacting or forwarding entity that the at least one contacting communicating device is attempting to contact. For example, establishing the suitable communication such as the telephone call, network interaction, etc. The order of the operations, methods, mechanisms, etc. as described with respect to FIG. 11 is intended to be illustrative in nature, and not limited in scope.

FIG. 12 shows one embodiment of the reverse-context system 100 in which the desired contacting or forwarding entity 106 at least partially transmits a called entity information at least partially describing an at least one desired contacting or forwarding entity that an at least one contacting communicating device is attempting to contact.

One embodiment of a high-level flowchart of a telephony technique 2600 is described with respect to FIG. 13 and can include, but is not limited to, operation 2602 and optional operation 2610. The high-level flowchart of FIG. 13 should be considered in combination with the embodiments of the reverse-context system 100, as described with respect to FIGS. 2, and/or 12. One embodiment of operation 2602 can include, but is not limited to, transferring from at least one desired contacting or forwarding entity a called entity information at least partially describing the at least one desired contacting or forwarding entity which an at least one contacting communicating device is attempting to contact. For example, transferring from the desired contacting or forwarding entity the called entity information that could be used to indicate the desired contacting or forwarding entity being attempted to be contacted, such as being called, etc. One embodiment of operation 2610 can include, but is not limited to, wherein the called entity information can be received by at least one receiving communicating device. For example, the receiving communicating device can receive the called entity information. The order of the operations, methods, mechanisms, etc. as described with respect to FIG. 13 is intended to be illustrative in nature, and not limited in scope.

Figure 14:
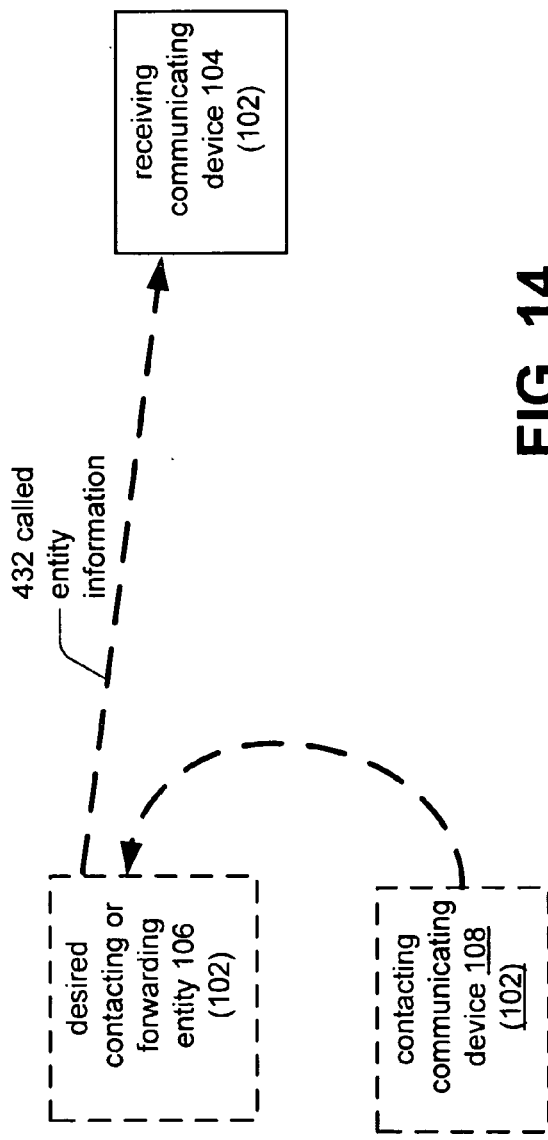
FIG. 14 is a diagram of yet another embodiment of the reverse-context system.

FIG. 14 shows one embodiment of the reverse-context system 100 in which the at least one receiving communicating device filters a called entity information at least partially describing an at least one desired contacting or forwarding entity that an at least one contacting communicating device is attempting to contact.

Figure 15:
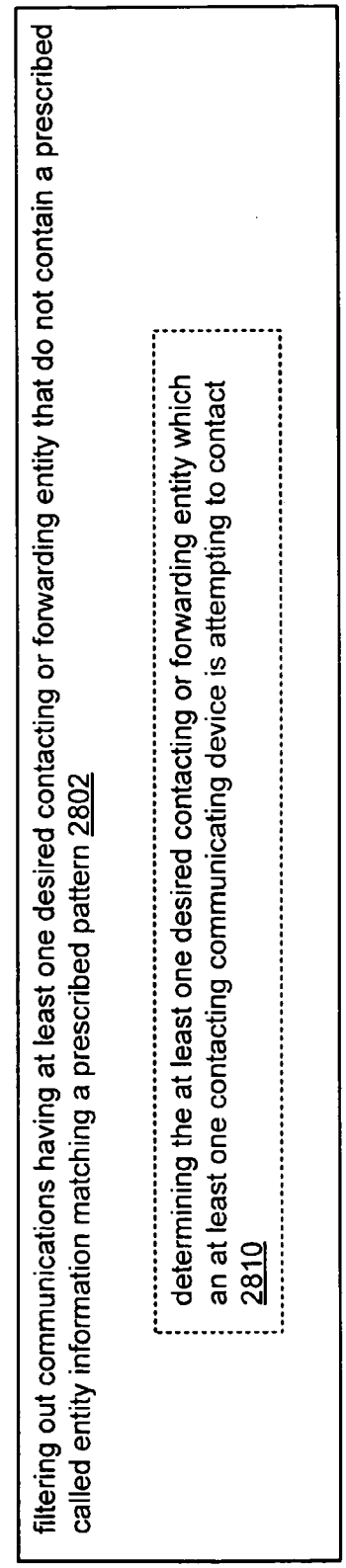
FIG. 15 is a flow chart of yet another embodiment of a reverse-context technique.

One embodiment of a high-level flowchart of a telephony technique 2800 is described with respect to FIG. 15 and can include, but is not limited to, operation 2802. One embodiment of operation 2802 can include, but is not limited to, operation 2810. The high-level flowchart of FIG. 15 should be considered in combination with the embodiments of the reverse-context system 100, as described with respect to FIGS. 2, and/or 14. One embodiment of operation 2802 can include, but is not limited to, filtering out communications having at least one desired contacting or forwarding entity that do not contain a prescribed called entity information matching a desired pattern. For example, filtering out, e.g., using computer processing or other automated techniques, those communications in which the called entity information does not match a prescribed pattern. One embodiment of the filtering out communications having at least one desired contacting or forwarding entity that do not contain a prescribed called entity information matching a prescribed pattern of operation 2802 can include operation 2810 which can include, but is not limited to, determining the at least one desired contacting or forwarding entity which an at least one contacting communicating device is attempting to contact. For example, determining the desired contacting or forwarding entity which the contacting communicating device is attempting to contact. The order of the operations, methods, mechanisms, etc. as described with respect to FIG. 15 is intended to be illustrative in nature, and not limited in scope.

In one or more various aspects, related systems include but are not limited to circuitry and/or programming for effecting the herein-referenced method aspects; the circuitry and/or programming can be virtually any combination of hardware, software, electromechanical system, and/or firmware configurable to effect the herein- referenced method aspects depending upon the design choices of the system designer.

4. Conclusion

This disclosure provides a number of embodiments of the reverse-context system. The embodiments of the reverse-context system as described with respect to this disclosure are intended to be illustrative in nature, and are not limiting its scope.

Those having skill in the art will recognize that the state of the art in computer, controller, communications, networking, and other similar technologies has progressed to the point where there is little distinction left between hardware, firmware, and/or software implementations of aspects of systems, such as may be utilized in the reverse-context system. The use of hardware, firmware, and/or software can therefore generally represent (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer and/or designer of the reverse-context system may opt for mainly a hardware and/or firmware vehicle. In alternate embodiments, if flexibility is paramount, the implementer and/or designer may opt for mainly a software implementation. In yet other embodiments, the implementer and/or designer may opt for some combination of hardware, software, and/or firmware. Hence, there are several possible techniques by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more goods, items, and/or services are intended to apply inclusively to either one or a plurality of those goods, items, and/or services.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   receiving call information through at least one of a packet switched network or a voice-over-internet-protocol (VOIP) network by a third communication device configured to output information configured to be received by at least one of a human user or a device associated with the human user in one or more established communication calls to at least one of the human user or an identifier associated with the human user during the one or more established calls, the call information sent to the third communication device as part of an attempt to establish a second communication call with the third communication device and a first communication device after an unsuccessful attempt by the first communication device and a second communication device to establish a first communication call between the first communication device and the second communication device, the call information including at least identifier information identifying the second communication device; and outputting by the third communication device a first indication of the attempt to establish the first communication call with the second communication device and a second indication that the attempt to establish the second communication call with the third communication device is subsequent to the unsuccessful attempt to establish the first communication call, the second indication being in a second language translated from a first language of the call information and including at least a portion of the identifier information identifying the second communication device included in the call information, the outputting by the third communication device of the first indication and the second indication configured to be received by at least one of the human user or the device associated with the human user and occurring subsequent to receiving the call information by the third communication device and prior to an establishment of the communication call with the third communication device.

2. The method of claim 1 wherein the receiving call information comprises:
receiving call information through a cellular network.

3. The method of claim 1, wherein the receiving call information comprises:
receiving through a video-conferencing service.

4. The method of claim 1, wherein the outputting by the third communication device the first indication comprises:
outputting the first indication as an audio communication.

5. The method of claim 1, wherein the outputting by the third communication device the first indication comprises:
outputting the first indication as a display output.

6. The method of claim 1, wherein the outputting by the third communication device the second indication comprises:
outputting the second indication as an audio communication.

7. The method of claim 1, wherein the outputting by the third communication device the second indication comprises:
outputting the second indication as a display output.

8. The method of claim 1, wherein the outputting by the third communication device the second indication comprises:
outputting the second indication as a voice prompt.

9. The method of claim 1, wherein the outputting by the third communication device the second indication comprises:
outputting the second indication through a computer-based display.

10. The method of claim 1, wherein the outputting by the third communication the second indication comprises:
outputting the second indication to include a telephone number.

11. The method of claim 1, wherein the outputting by the third communication device the first indication comprises:
outputting by the third communication device the second indication in a spoken language translated from a first spoken language of the call information.

12. The method of claim 1, wherein the outputting by the third communication device the first indication comprises:
outputting by the third communication device the second indication in a dialect translated from a first dialect of the call information.

13. The method of claim 1, wherein the outputting by the third communication device the first indication comprises:
outputting by the third communication device the second indication in a second language associated with a second location translated from a first language associated with a first location of the call information.

14. A method comprising:
receiving call information through at least one of a packet switched network or a voice-over-internet-protocol (VOIP) network by a third communication device configured to output information configured to be received by at least one of a human user or a device associated with the human user in one or more established communication calls to at least one of the human user or an identifier associated with the human user during the one or more established calls, the call information sent to the third communication device as part of an attempt to establish a second communication call with the third communication device and a first communication device after an unsuccessful attempt by the first communication device and a second communication device to establish a first communication call with the first communication device and the second communication device, the call information including at least identifier information identifying the second communication device; and if and only if the identifier information identifying the second communication device satisfies a predetermined criteria, outputting by the third communication device a first indication of the attempt to establish the first communication call with the second communication device and a second indication that the attempt to establish the second communication call with the third communication device is subsequent to the unsuccessful attempt to establish the first communication call, the second indication being in a second language translated from a first language of the call information and including at least a portion of the identifier information identifying the second communication device included in the call information, the outputting by the third communication device of the first indication and the second indication configured to be received by at least one of the human user or the device associates with the human user and occurring subsequent to receiving the call information by the third communication device and prior to an establishment of the communication call with the third communication device.

15. The method of claim 14, wherein the if and only if the identifier information identifying the second communication device satisfies a predetermined criteria, outputting by the third communication the first indication comprises:
the identifier information identifying the second communication device includes at least a phone number and the predetermined criteria include at least a phone number list containing the phone number.

16. A method comprising: receiving call information through at least one of a packet switched network or a voice-over-internet-protocol (VOIP) network by a third communication device configured to output information configured to be received by at least one of a human user or a device associated with the human user in one or more established communication calls to at least one of the human user or an identifier associated with the human user during the one or more established calls, the call information sent to the third communication device as part of an attempt to establish a second communication call with the third communication device and a first communication device after an unsuccessful attempt by a second communication device to receive a first communication call from the first communication device, the call information including at least identifier information identifying the second communication device;

outputting by the third communication device a first indication of the attempt to establish the first communication call with the second communication device, the outputting of the first indication configured to be received by at lease one of the human user or the device associated with the human user and occurring at least during one or more portions of the attempt to establish the first communication call with the third communication device; and outputting by the third communication device a second indication that the attempt to establish the second communication call with the third communication device is subsequent to the unsuccessful attempt to receive the first communication call from the first communication device, the outputting of the second indication being in a second language translated from a first language of the call information and configured to be received by at least one of the human user or the device associated with the human user and occurring at least during a second portion of the attempt to establish the second communication call with the third communication device, the second indication including at least a portion of the identifier information identifying the second communication device included in the call information.

17. The method of claim 16, wherein the receiving call information comprises:
   receiving call information through a cellular service.

18. The method of claim 16, wherein the receiving call information comprises:
   receiving call information through a video-conferencing service.

19. The method of claim 16, wherein the outputting by the third communication device the first indication comprises:
   outputting the first indication as an audio communication.

20. The method of claim 16, wherein the outputting by the third communication device the first indication comprises:
   outputting the first indication as a display output.

21. The method of claim 16, wherein the outputting by the third communication device the second indication comprises:
   outputting the second indication as an audio communication.

22. The method of claim 16, wherein the outputting by the third communication device the second indication comprises:
   outputting the second indication as a display output.

23. The method of claim 16, wherein the outputting by the third communication device the second indication comprises:
   outputting the second indication as a voice prompt.

24. The method of claim 16, wherein the outputting by the third communication device the second indication comprises:
   outputting the second indication through a computer-based display.

25. The method of claim 16, wherein the outputting by the third communication device the second indication comprises:
   outputting the second indication to include a telephone number.

26. A method comprising:
   receiving call information through at least one of a packet switched network or a voice-over-internet-protocol (VOIP) network by a third communication device configured to output information configured to be received by at least one of a human user or a device associated with the human user in one or more established communication calls to at least one of the human user or an identifier associated with the human user during the one or more established calls, the call information sent to the third communication device as part of an attempt to establish a second communication call with the third communication device and a first communication device after an unsuccessful attempt by the first communication device and a second communication device to establish a first communication call between the first communication device and the second communication device, the call information including at least identifier information identifying the second communication device;

if and only if the identifier information identifying the second communication device satisfies a predetermined criteria, outputting by the third communication device a first indication of the attempt to establish the first communication call with the third communication device, the outputting of the first indication configured to be received by at least one of the human user or the device associated with the human user and occurring at least during one or more portions of the attempt to establish the second communication call with the third communication device; and if and only if the identifier information identifying the second communication device satisfies the predetermined criteria, outputting by the third communication device a second indication that the attempt to establish the second communication call with the third communication device is subsequent to the unsuccessful attempt to establish the first communication call, the outputting of the second indication configured to be received by at least one of the human user or the device associated with the human user and occurring at least during one or more portions of the attempt to establish the second communication call with the third communication device, the second indication being in a second language translated from a first language of the call information and including at least a portion of the identifier information identifying the second communication device included in the call information.

27. The method of claim 26, wherein the if and only if the identifier information identifying the second communication device satisfies a predetermined criteria, outputting by the third communication device the first indication comprises:
   the identifier information identifying the second communication device includes at least a phone number and a location of the second communication device and the predetermined criteria include at least a phone number list containing the phone number.

28. A method comprising:
   receiving call information through at least one of a packet switched network or a voice-over-internet-protocol (VOIP) network as part of an unsuccessful attempt by a first communication device to establish a first communication call between the first communication device and a second communication device, the call information including at least identifier information identifying a location of the second communication device;

modifying the call information to indicate the attempted communication call with the second communication device was unanswered by the second communication device; and sending the modified call information to attempt to establish a second communication call between the first communication and a third communication device configured to output information in one or more established communication calls to at least one of the human user or an identifier associated with the human user, the modified call information being readable by the third communication device for the third communication device to output a first indication that the attempt to establish the second communication call between the first communication device and the third communication device is occurring and for the third communication device to output a second indication that the attempted first communication call by the first communication device with the second communication device was unanswered by the second communication device, the outputting of the first indication by the third communication device configured to be received by at least one or the human user or the device associated with the human user and occurring at least during one or more portions of the attempt by the first communication device to establish the second communication call with the third communication device, the outputting of the second indication by the third communication device configured to be received by at least one of the human user or the device associated with the human user and occurring at least during one or more portions of the attempt by the first communication device to establish the second communication call with the third communication device.

* * * * *

UNITED STATES PATENT AND TRADEMARK OFFICE
CERTIFICATE OF CORRECTION

PATENT NO. : 8,799,352 B2  
APPLICATION NO. : 11/451130  
DATED : August 5, 2014  
INVENTOR(S) : Alexander J. Cohen et al.

Page 1 of 1

It is certified that error appears in the above-identified patent and that said Letters Patent is hereby corrected as shown below:

In the Claims

At Column 26, Line 5, Claim 28, please replace "... figured to be received by at least one or the human ..." with --... figured to be received by at least one of the human ...--

Signed and Sealed this
First Day of September, 2015

Michelle K. Lee
*Director of the United States Patent and Trademark Office*